US011413988B2

(12) United States Patent
Samain et al.

(10) Patent No.: US 11,413,988 B2
(45) Date of Patent: Aug. 16, 2022

(54) CLUTCH-BASED ADJUSTMENT MECHANISM FOR MOTORIZED MULTI-WAY SEAT ADJUSTMENT

(71) Applicant: Schukra Geratebau GmbH, Berndorf (AT)

(72) Inventors: Maxime Samain, Harelbeke (BE); Koen Decaluwe, Ledegem (BE)

(73) Assignee: Schukra Geratebau GmbH, Berndorf (AT)

( * ) Notice: Subject to any disclaimer, the term of this patent is extended or adjusted under 35 U.S.C. 154(b) by 104 days.

(21) Appl. No.: 16/763,641

(22) PCT Filed: Nov. 20, 2018

(86) PCT No.: PCT/EP2018/081921
§ 371 (c)(1),
(2) Date: May 13, 2020

(87) PCT Pub. No.: WO2019/105803
PCT Pub. Date: Jun. 6, 2019

(65) Prior Publication Data
US 2020/0282865 A1    Sep. 10, 2020

(30) Foreign Application Priority Data
Nov. 29, 2017 (EP) .................... 17204407

(51) Int. Cl.
*B60N 2/853* (2018.01)
*B60N 2/829* (2018.01)
(Continued)

(52) U.S. Cl.
CPC ........... *B60N 2/0232* (2013.01); *B60N 2/233* (2013.01); *B60N 2/62* (2013.01); *B60N 2/66* (2013.01);
(Continued)

(58) Field of Classification Search
CPC . B60N 2002/0236; B60N 2/853; B60N 2/829
See application file for complete search history.

(56) References Cited

U.S. PATENT DOCUMENTS 2,837,930 A * 6/1958 Desmond ............ F16H 25/2015
74/89.39
4,309,015 A 1/1982 Muhr
(Continued)

FOREIGN PATENT DOCUMENTS

CN    111775797 A  * 10/2020
DE    10006099 A1    8/2001
(Continued)

OTHER PUBLICATIONS

International Search Report and Written Opinion dated Feb. 27, 2019, Intl. Appl. No. PCT/2018/081921 (10 pages).

*Primary Examiner* — Timothy J Brindley
(74) *Attorney, Agent, or Firm* — Michael Best & Friedrich LLP

(57) ABSTRACT

Clutch-based adjustment mechanism for motorized multi-way seat adjustment An adjustment mechanism comprises multiple screw shafts (111, 112, 113) and a motor (150) for driving the screw shafts. Further, the adjustment mechanism comprises a clutch mechanism (160) for selectively engaging the motor (150) with one or more of the screw shafts (111, 112, 113). A rotation of one or more of the screw shafts (111, 12, 113) caused by the motor (150) translates into adjustment of the seat according to a first degree of freedom. A rotation of one or more others of the screw shafts (111, 12, 113) caused by the motor (150) translates into adjustment of the seat according to a second degree of freedom.

14 Claims, 9 Drawing Sheets

(51) Int. Cl.
*B60N 2/02* (2006.01)
*B60N 2/23* (2006.01)
*B60N 2/62* (2006.01)
*B60N 2/66* (2006.01)
*F16H 25/20* (2006.01)
*F03G 7/06* (2006.01)
*F16D 11/14* (2006.01)

(52) U.S. Cl.
CPC ............ *B60N 2/829* (2018.02); *B60N 2/853* (2018.02); *F16H 25/20* (2013.01); *B60N 2002/0236* (2013.01); *F03G 7/065* (2013.01); *F16D 11/14* (2013.01); *F16H 2025/209* (2013.01); *F16H 2025/2046* (2013.01); *F16H 2025/2071* (2013.01); *F16H 2025/2081* (2013.01); *F16H 2025/2084* (2013.01)

(56) References Cited

U.S. PATENT DOCUMENTS

| | | | | |
|---|---|---|---|---|
| 5,103,691 | A * | 4/1992 | Periou | B60N 2/0248 74/665 GD |
| 6,553,866 | B1 * | 4/2003 | Ursel | B60N 2/0296 74/665 G |
| 8,926,020 | B2 | 1/2015 | Jeong | |
| 9,604,550 | B2 * | 3/2017 | Ito | B60N 2/067 |
| 9,616,783 | B2 * | 4/2017 | Ito | B60N 2/06 |
| 10,144,321 | B2 | 12/2018 | Line et al. | |
| 10,315,546 | B2 | 6/2019 | An et al. | |
| 10,378,250 | B2 * | 8/2019 | Alacqua | E05B 17/0062 |
| 10,500,997 | B2 | 12/2019 | Maloney et al. | |
| 10,780,798 | B2 | 9/2020 | Falster et al. | |
| 10,836,289 | B2 | 11/2020 | Jeong | |
| 10,899,260 | B2 * | 1/2021 | Dillinger | B60N 2/821 |
| 10,926,684 | B2 | 2/2021 | Little | |
| 2001/0028191 | A1 * | 10/2001 | Lance | B60N 2/0224 297/410 |
| 2015/0183347 | A1 * | 7/2015 | Falster | B60N 2/865 297/410 |
| 2017/0044805 | A1 * | 2/2017 | Deppe | F16H 25/2015 |
| 2017/0127844 | A1 | 5/2017 | Grone | |
| 2017/0253153 | A1 * | 9/2017 | Kapusky | B60N 2/821 |
| 2017/0313218 | A1 * | 11/2017 | Line | B60N 2/6009 |
| 2019/0315256 | A1 * | 10/2019 | Maloney | B60N 2/865 |
| 2020/0223325 | A1 * | 7/2020 | Pinkelman | B60N 2/4279 |
| 2020/0369188 | A1 * | 11/2020 | Samain | B60N 2/829 |

FOREIGN PATENT DOCUMENTS

| | | | | |
|---|---|---|---|---|
| DE | 102014205457 | A1 * | 9/2015 | ............ B60N 2/856 |
| EP | 0383798 | B1 | 1/1993 | |
| EP | 2698278 | A1 | 2/2014 | |
| EP | 2921341 | A1 * | 9/2015 | ............ B60N 2/885 |
| EP | 3492310 | A1 * | 6/2019 | ............ B60N 2/885 |
| EP | 3492311 | A1 * | 6/2019 | ............ B60N 2/809 |
| FR | 2446199 | | 8/1990 | |
| JP | H07164934 | A | 6/1995 | |
| JP | 2005058287 | A | 3/2005 | |
| WO | 2017032390 | A1 | 3/2017 | |

* cited by examiner

CLUTCH-BASED ADJUSTMENT MECHANISM FOR MOTORIZED MULTI-WAY SEAT ADJUSTMENT

FIELD OF THE INVENTION

The present invention relates to an adjustment mechanism for a seat and to a seat equipped with such adjustment mechanism. The invention relates in particular to an adjustment mechanism for motorized multi-way adjustment of a seat.

BACKGROUND OF THE INVENTION

In view of optimizing comfort of a seat, it is known to provide the seat with various kinds of adjustability. By way of example, it is known to adjust a vehicle seat with respect to inclination of a backrest portion of the seat, with respect to height of a headrest of the seat, or with respect to arching and/or vertical position of a lumbar support of the seat.

To facilitate adjustment of the seat, it is also known to implement adjustment of the seat in a motorized manner. For example, WO 2017/032390 A1 describes a motorized adjustment mechanism which can be used for adjusting various seat components. EP 2 698 278 A1 describes a motorized adjustment mechanism for a headrest which may be used for shifting the headrest in a forward/backward direction or for adjusting the position of side bolsters of the headrest.

However, in such known adjustment mechanisms, a separate adjustment mechanism and motor is may need to be provided for each adjustment degree of freedom. For example, EP 2 698 278 A1 describes usage of two separate actuators in the headrest of the seat, one being provided for adjustment of the headrest in a forward/backward direction, the other being provided for height adjustment of the headrest.

Accordingly, there is a need for adjustment mechanisms which allow for efficiently adjusting a seat according to multiple degrees of freedom.

BRIEF SUMMARY OF THE INVENTION

An adjustment mechanism according to an embodiment has the purpose of being used in a seat, for adjusting the seat according to at least two degrees of freedom. Examples of such degrees of freedom are tilting of one or more flap elements, such as side bolsters or a leg support, horizontal movement of a headrest of the seat in a forward/backward direction, vertical movement of the headrest of the seat, length adjustment of a seat cushion portion of the seat, height adjustment of a lumbar support of the seat, or adjustment of arching of a lumbar support of the seat.

According to an embodiment, the adjustment mechanism comprises multiple screw shafts and a motor for driving the screw shafts. Further, the adjustment mechanism comprises a clutch mechanism for selectively engaging the motor with one or more of the screw shafts. A rotation of one or more of the screw shafts caused by the motor translates into adjustment of the seat according to a first degree of freedom. A rotation of one or more others of the screw shafts caused by the motor translates into adjustment of the seat according to a second degree of freedom. Accordingly, multiple degrees of freedom may be efficiently supported by a single motor. The first degree of freedom and the second degree of freedom may correspond to two different degrees of freedom from a group comprising displacement of a headrest of the seat in a horizontal direction, tilting of a headrest of the seat, vertical displacement of a headrest of the seat, tilting of at least one flap element of the seat, vertical displacement of a lumbar support of the seat, adjustment of arching of a lumbar support of the seat, and adjustment of a length of a seat cushion portion of the seat. One or more nut elements may be engaged with at least some of the screw shafts, such that a rotation of these screw shafts translates into a linear movement of the nut elements, and this linear movement of the nut elements may in turn translate into the adjustment according to the first degree of freedom and/or according to the second degree of freedom.

According to an embodiment, the adjustment mechanism comprises, on a drive shaft of one of the screw shafts, a first wheel which is rotatable with respect to the drive shaft and a second wheel which can be selectively engaged with the first wheel. In this way, it can be efficiently controlled whether the rotation of the first wheel translates into rotation of the screw shaft.

According to an embodiment, at least one of the first wheel and the second wheel is a gear wheel engaged with a gear wheel on a drive shaft of another one of the screw shafts. In this way, the clutch mechanism allows for efficiently driving one screw shaft from another screw shaft, which in turn facilitates implementing the clutch mechanism in a compact manner.

According to an embodiment, the first degree of freedom comprises to displacement of a headrest of the seat in a horizontal direction or to tilting of the headrest and the second degree of freedom corresponds to displacement of a headrest of the seat in a vertical direction. Accordingly, the adjusting mechanism may allow for efficiently supporting multiple degrees of freedom related to adjustment of the headrest.

According to an embodiment, the multiple screw shafts comprise at least one first screw shaft and at least one second screw shaft. Further, the adjustment mechanism comprises at least one nut element engaged with the at least one first screw shaft such that a rotation of the at least one first screw shaft caused by the motor translates into a linear motion of the at least one nut element. In a first range of the linear motion of the at least one nut element the linear motion translates into adjustment of the seat according to a one of the first degree of freedom and the second degree of freedom and in a second range of the linear motion of the at least one nut element the linear motion translates into adjustment of the seat according to a third degree of freedom. Accordingly, an additional degree of freedom may be efficiently supported without requiring more screw shafts.

According to an embodiment, the headrest comprises at least one flap element, e.g., side bolsters, which is pivotable with respect to a main portion of the headrest and the third degree of freedom corresponds to pivoting of the at least one flap element with respect to the main portion of the headrest. More specifically, the headrest may comprise a first flap element which is pivotable with respect to the main portion of the headrest and second flap element which is pivotable with respect to the main portion of the headrest, and the second degree of freedom corresponds to pivoting of the first flap element and the second flap element with respect to the main portion of the headrest. Accordingly, horizontal displacement or tilting of the headrest, or other degrees of freedom related to adjustment of the headrest, may be efficiently combined with tilting of the flap element(s).

According to an embodiment, at least one of the at least one screw shafts is arranged in a horizontal direction. In addition or alternatively, at least one of the at least one screw shafts may be arranged in a vertical direction. Using a horizontal screw shaft, adjustments in a horizontal direction may be efficiently supported, and using a vertical screw shaft, adjustments in a vertical direction may be efficiently supported.

According to an embodiment, the clutch mechanism comprises at least one solenoid actuator for switching the clutch mechanism between a first state in which the motor is engaged with one or more of the screw shafts and second state in which the motor is not engaged with said one or more of the screw shafts. The solenoid actuator may be controlled electronically.

According to an embodiment, the clutch mechanism comprises at least one shape memory alloy (SMA) actuator for switching the clutch mechanism between a first state in which the motor is engaged with one or more of the screw shafts and second state in which the motor is not engaged with said one or more of the screw shafts. The SMA actuator may be controlled electronically.

According to an embodiment, the adjustment mechanism is configured to be accommodated within a headrest of the seat, within a backrest portion of the seat, and/or within a seat cushion portion of the seat. Accordingly, the adjustable seat may be implemented in a compact manner, by efficiently using space which is available within the components of the seat. The component of the seat for accommodation of the adjustment mechanism may be chosen according to the degrees of freedom to be controlled.

According to a further embodiment, a seat is provided, e.g., a vehicle seat. The seat comprises an adjustment mechanism as defined above. Using this adjustment mechanism, the seat can be adjusted according to two or more degrees of freedom. As mentioned above, examples of such degrees of freedom are tilting of one or more flap elements, such as side bolsters or a leg support, horizontal movement of a headrest of the seat in a forward/backward direction, vertical movement of the headrest of the seat, length adjustment of a seat cushion portion of the seat, height adjustment of a lumbar support of the seat, or adjustment of arching of a lumbar support of the seat.

Accordingly, in some embodiments the seat comprises a headrest. In this case the adjustment mechanism may be used for adjustments according to degrees of freedom related to the headrest and may be accommodated within the headrest. In this way, a compact design of the seat may be achieved. Further, distances over which force and/or torque needs to be transmitted may be limited, which may help to improve efficiency, durability, and reliability.

BRIEF DESCRIPTION OF DRAWINGS

Embodiments of the invention will be described with reference to the accompanying drawings.

DETAILED DESCRIPTION OF EMBODIMENTS

Exemplary embodiments of the invention will be described with reference to the drawings. While some embodiments will be described in the context of specific fields of application, such as in the context of a vehicle seat, the embodiments are not limited to this field of application. The features of the various embodiments may be combined with each other unless specifically stated otherwise.

Figure 1A:
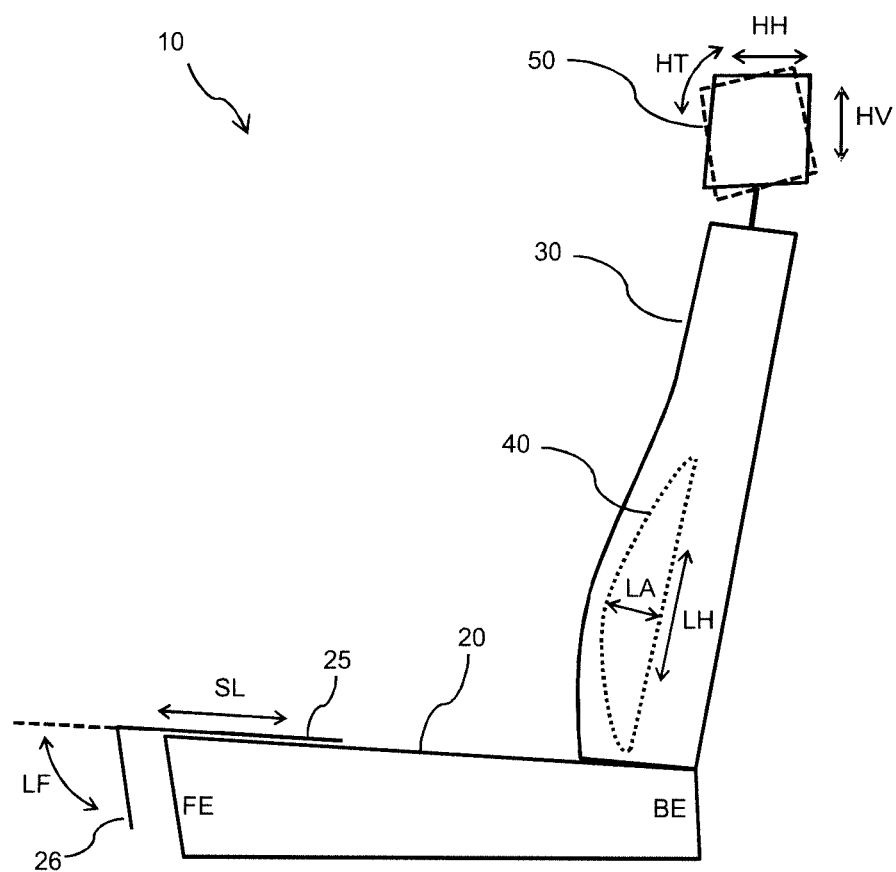
FIGS. 1A and 1B illustrate an adjustable seat according to an embodiment of the invention.
Figure 1B:
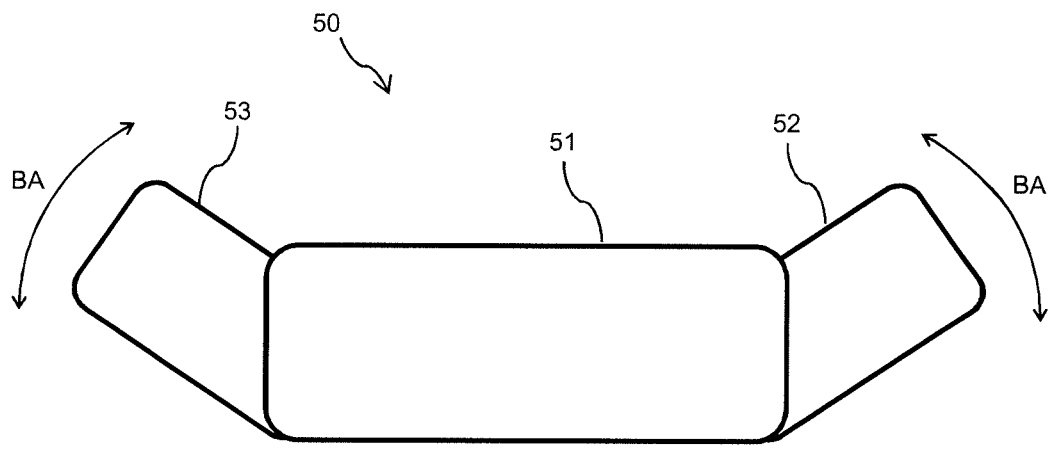

FIGS. 1A and 1B schematically illustrate an adjustable seat 10. Specifically, FIGS. 1A and 1B illustrated various degrees of freedom of adjusting the seat 10. In the illustrated example, it is assumed that the seat 10 is a vehicle seat, in particular a driver's seat or a passenger seat for a car. However, it is noted that similar configurations could also be used for other types of seats, e.g., seats for other types of vehicles, such as trucks, aircrafts or trains, or seating furniture.

As illustrated, the seat 10 comprises a seat cushion portion 20, a backrest portion 30, and a headrest 50. The backrest portion 30 may be provided with a lumbar support 40, e.g., configured as a wire basket or as a flexible plastic element. The seat 10 is assumed to be adjustable according to various degrees of freedom, illustrated by double-headed arrows. As illustrated, these degrees of freedom may include: displacement of the headrest 50 in a horizontal direction, denoted by HH, displacement of the headrest 50 in a vertical direction, denoted by HV, displacement of the lumbar support 40 in a horizontal direction, denoted by LH, adjustment of arching of the lumbar support 40, denoted by LA, adjustment of a horizontal length of the seat cushion portion 20, denoted by SL, and tilting of a leg support at a front edge of the seat cushion portion 20, denoted by LF. Here, a "horizontal" direction refers to a normal installation position of the seat and substantially corresponds to a direction within a plane of the seat cushion portion 20. In particular, a horizontal displacement as described herein may correspond to a displacement along a forward/backward direction, the forward direction corresponding to a direction from a back edge BE of the seat cushion portion 20, where the backrest portion 30 is attached, to an opposing front edge FE of the seat cushion portion 20, and the backward direction corresponding to a direction from the front edge FE to the back edge BE. A "vertical" direction refers to a direction along the backrest portion 30. The vertical direction is typically substantially perpendicular to the horizontal direction. The vertical direction may also be referred to as upward/downward direction, with the upward direction corresponding to a direction from the seat cushion portion 20 towards the headrest 50 and the downward direction corresponding to a direction from the headrest 50 towards the seat cushion portion 20. It is noted that in some situations, e.g., when the backrest portion 30 is tilted backwards into a sleeping position, the vertical or upward/downward direction may also deviate from a direction which is perpendicular to the horizontal direction.

As illustrated in FIG. 1A, the adjustability of the length of the seat cushion portion 20 may be implemented by providing the seat cushion portion 20 with a seat cushion element 25 which is slidable in the forward/backward direction with respect to a main part of the seat cushion portion 20. The above-mentioned tiltable leg support may be provided by a flap element 26 on a front edge side of the slidable seat cushion element 25.

FIG. 1B shows a schematic top view of the headrest 50. As further illustrated in FIG. 1B, a further degree of freedom for adjustment of the seat 10 may correspond to adjustment of side bolsters of the headrest 50, denoted by BA. In particular, the headrest 50 may be provided with a main portion 51, a first flap element 52 on a right side of the main portion 51, and a second flap element 53 on a left side of the main portion 51. As illustrated, the flap elements 52, 53 can be tilted about a vertical axis with respect to the main portion 51 of the headrest 51. The flap element 52 thus defines an adjustable right side bolster of the headrest, and the flap element 53 defines an adjustable left side bolster of the headrest 50.

It is noted that the above degrees of freedom for adjustment of the seat 10 are to be understood as a non-exhaustive list of examples of adjustability. Accordingly, adjustment according to all of these degrees of freedom does not need to be supported by the seat 10, or the seat 10 could also support adjustment according to one or more other degrees of freedom.

In the examples as further explained in the following, it is assumed that adjustment of the seat 10 according to at least two degrees of freedom is implemented in a motorized manner, using a single motor. An example of a corresponding adjustment mechanism will now be further explained with reference to FIGS. 2A, 2B, 2C, 3A, 3B, 3C, 4A, 4B, 4C, 5A, 5B, 6, 7A, and 7B. In this example, it is assumed that the adjustment mechanism provides motorized adjustment of the seat 10 by horizontal displacement of the headrest 50, i.e., according to the degree of freedom denoted by HH, by vertical displacement of the headrest 50, i.e., according to the degree of freedom denoted by HV, and tilting of the side bolsters of the headrest 50, i.e., according to the degree of freedom denoted by BA. However, it is to be noted that a similar configuration of the adjustment mechanism could also be used for adjustment according to other combinations of two or more degrees of freedom.

Figure 2A:
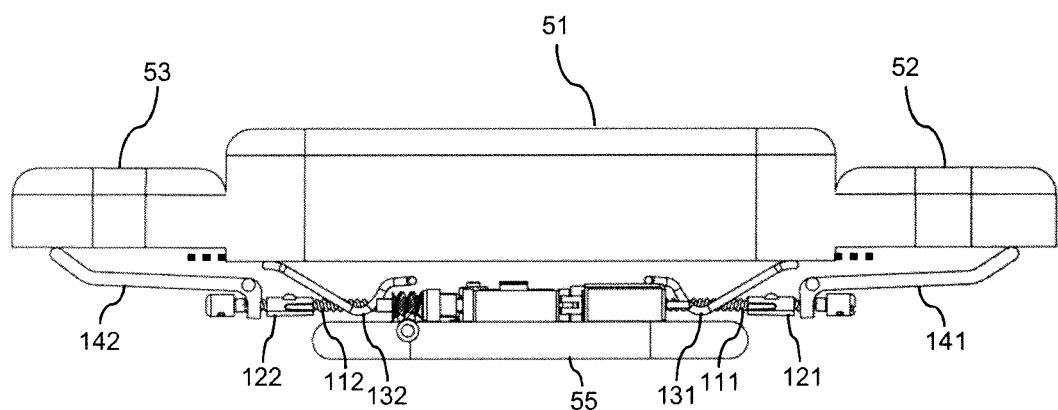
FIGS. 2A, 2B, and 2C illustrate an adjustment mechanism for adjustment of the headrest of the seat according to multiple degrees of freedom.
Figure 2B:
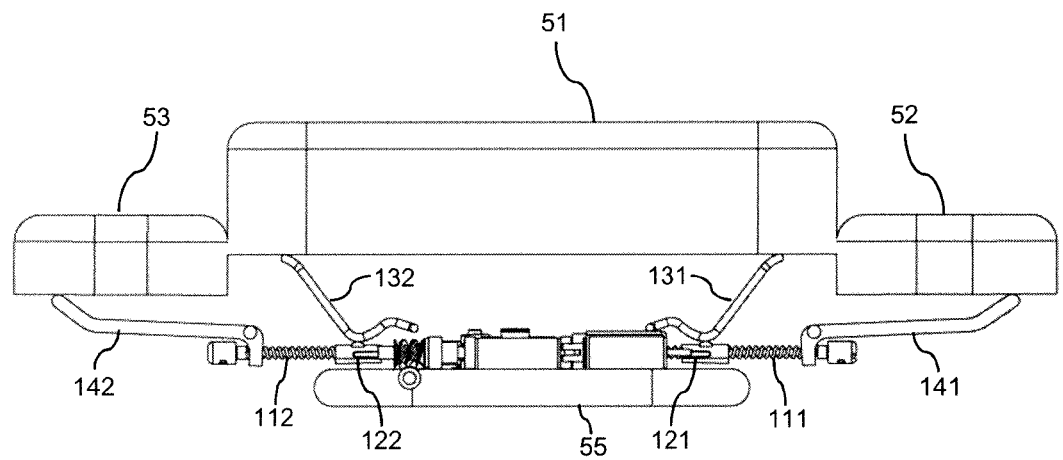
Figure 2C:
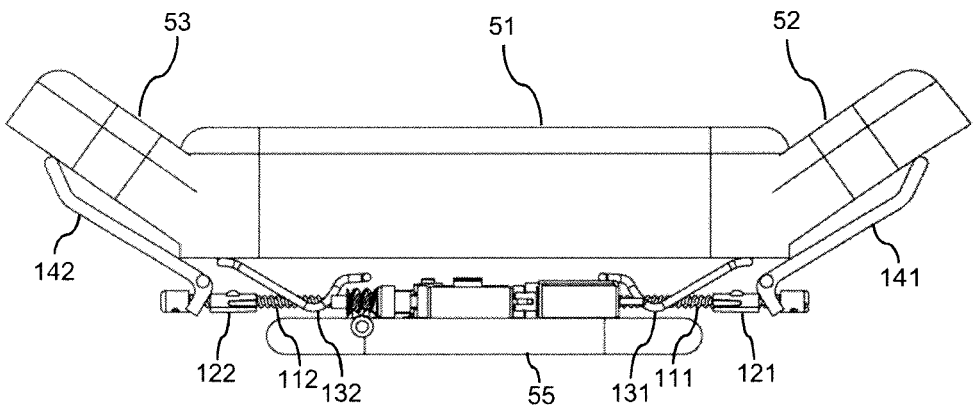

FIGS. 2A, 2B, and 2C show top views of the headrest 50 in different adjustment states, with the adjustment mechanism being exposed for purposes of illustration. Specifically, FIG. 2A illustrates the headrest 50 in a neutral position, FIG. 2B illustrates the headrest 50 with the main portion of the headrest 50 being displaced out of the neutral position in the forward direction, and FIG. 2C illustrates the headrest 50 with the flap elements 52, 53 being tilted out of the neutral position. The adjustment mechanism couples the main portion 51 and the flap elements 52, 53 to a bracket 55, by means of which the headrest 50 is attached to the backrest portion 30 of the seat 10. The adjustment mechanism is based on a spindle drive and uses screw shafts 111, 112 (or spindles) for driving the motorized adjustment. As illustrated, the screw shafts 111, 112 extend horizontally in opposite directions from a central part of the adjustment mechanism. A first nut element 121 is engaged with the first screw shaft 111, and a second nut element 122 is engaged with the second screw shaft 112. The first nut element 121 and the second nut element 122 are movable along the respective screw shaft 111, 112, but locked with respect to a rotation about the screw shaft 111, 112. Accordingly, a rotation of the screw shaft 111, 112 translates into a linear movement of the respective nut element 121, 122 along the screw shaft 111, 112. In the illustrated example, it is assumed that the first screw shaft 111 and the second screw shaft 112 are formed on opposite ends of a single drive shaft. Accordingly, rotation of this drive shaft produces a corresponding rotation of the first screw shaft 111 and the second screw shaft 112, which in turn translates into the linear movement of the nut elements 121, 122. One of the first screw shaft 111 and the second screw shaft 112 is assumed to have a left-handed thread, while the other of the first screw shaft 111 and the second screw shaft 112 has a right handed thread. Accordingly, if the drive shaft is rotated in a certain direction, the linear movements of the not elements 121, 122 will be in opposite directions.

As further illustrated, the main portion 51 of the headrest 50 is coupled by levers 131, 132 to the bracket 55. The levers 131, 132 are each supported to be rotatable about a vertical tilt axis. In a first range of the linear movement of the nut elements 121, 122, the nut element 121 is engaged with the lever 131, and the nut element 122 is engaged with the lever 132. This has the effect that the linear movements of the nut elements 121, 122 translate into rotation of the levers 131, 132, which in turn displaces the main portion 51 of the headrest 50 in the forward/backward direction, as illustrated in FIG. 2B.

As further illustrated, the flap element 52 of the headrest 50 is coupled by a lever 141 to the bracket 55, and the flap element 53 of the headrest is coupled by a lever 142 to the bracket 55. The levers 141, 142 are each supported to be rotatable about a vertical tilt axis. In a second range of the linear movement of the nut elements 121, 122, the nut element 121 is engaged with the lever 141, and the nut element 142 is engaged with the lever 142. This has the effect that the linear movements of the nut elements 121, 122 translate into rotation of the levers 141, 142, which in turn tilts the flap elements 52, 53 of the headrest 50, as illustrated in FIG. 2C.

It is noted that while in FIGS. 2A, 2B, and 2C the displacement of the main portion 51 of the headrest 50 in the/backward direction is illustrated as occurring without moving the flap elements 52, 53, it is also possible to couple movement of the flap elements 52, 53 in the forward/backward direction to the movement of the main portion 51 in the forward/backward direction. This may for example be achieved by coupling the flap elements 52, 53 to the main portion 51, e.g., by upholstery elements and/or a common cover, and/or by providing a support on the main portion 51, such as illustrated by short dotted lines in FIG. 2A. Accordingly, the adjustment mechanism may also be used for horizontal displacement of the headrest 50 as whole.

Figure 3A:
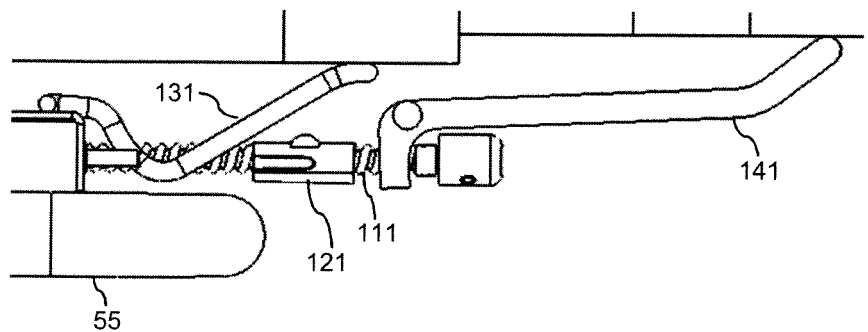
FIGS. 3A, 3B, and 3C illustrate adjustment of the headrest by horizontal displacement of the headrest.
Figure 3B:
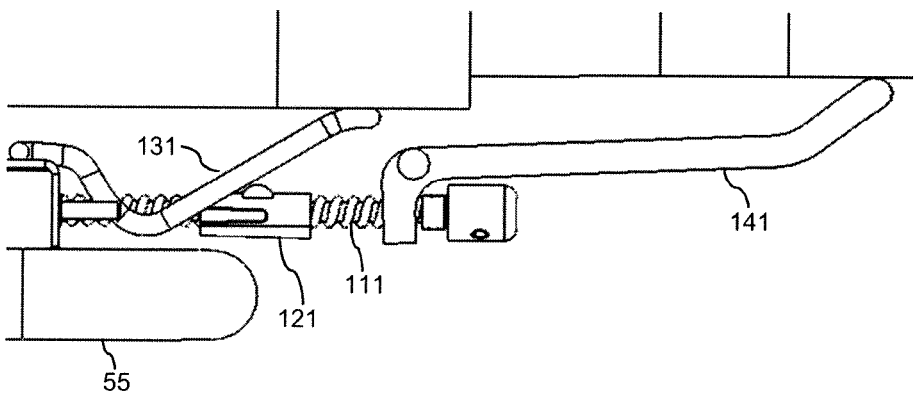
Figure 3C:
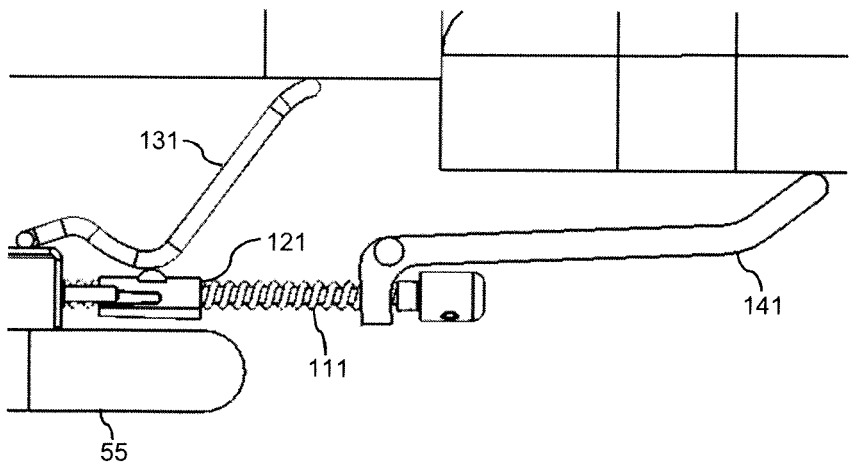

FIGS. 3A, 3B, and 3C further illustrate the adjustment of the headrest 50 by horizontal displacement of the main portion 51 of the headrest 50. Specifically, FIGS. 3A, 3B, and 3C further illustrate actuation of the lever 131 by the nut element 121. Here, it is to be understood that the lever 132 will be actuated in a corresponding manner by the nut element 122.

FIG. 3A illustrates a state in which the nut element 121 and the lever 131 are in a neutral position and not yet engaged with each other. By rotation of the screw shaft 111 in a first direction, the nut element 121 may be moved towards the lever 131, until it eventually engages with the lever 131, as illustrated in FIG. 3B. By further rotation of the screw shaft 111 in the first direction, the nut element 121 is urged against the lever 131, causing rotation of the lever 131 and forward displacement of the main portion 51 of the headrest 50, until reaching a maximum displacement position as illustrated in FIG. 3C. When rotating the screw shaft 111 in the opposite direction, the lever 131 is gradually allowed to return to its neutral position. This return movement may for example be driven by spring force. For example, the lever 131 could be coupled to a spring element which is deformed when rotating the lever 131 out of its neutral position, or the lever 131 could itself exhibit a spring characteristic.

Figure 4A:
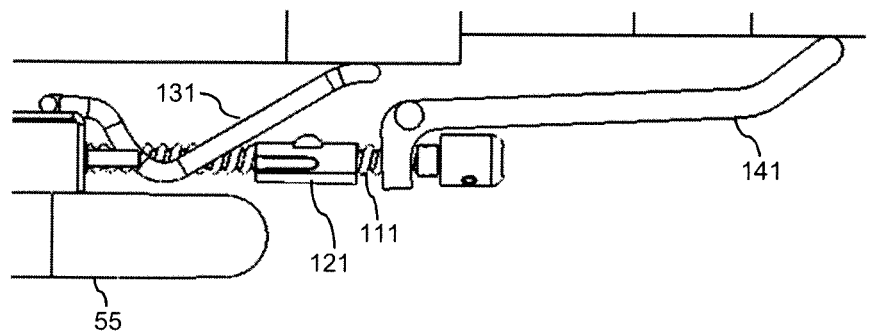
FIGS. 4A, 4B, and 4C illustrate adjustment of the headrest by tilting flap elements of the headrest.
Figure 4B:
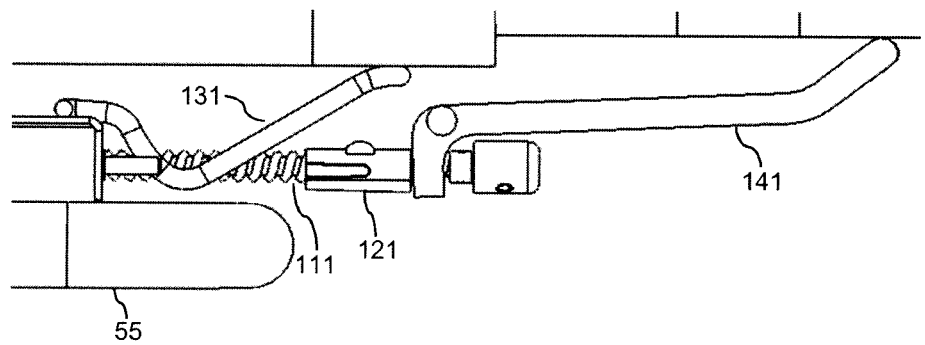
Figure 4C:
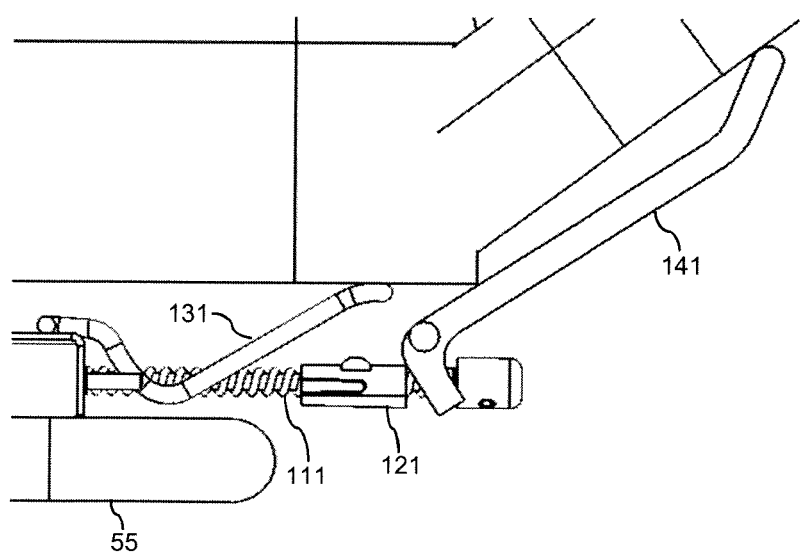

FIGS. 4A, 4B, and 4C illustrate adjustment of the headrest by tilting the flap elements 52, 53 of the headrest 50. Specifically, FIGS. 4A, 4B, and 4C further illustrate actuation of the lever 141 by the nut element 121. Here, it is to be understood that the lever 142 will be actuated in a corresponding manner by the nut element 122.

FIG. 4A illustrates a state in which the nut element 121 and the lever 141 are in a neutral position and not yet engaged with each other. By rotation of the screw shaft 111 in a second direction which is opposite to the above-mentioned first direction, the nut element 121 may be moved towards the lever 141, until it eventually engages with the lever 141, as illustrated in FIG. 4B. By further rotation of the screw shaft 111 in the second direction, the nut element 121 is urged against the lever 141, causing rotation of the lever 141 and tilting of the flap element 52 of the headrest 50, until reaching a maximum tilt position as illustrated in FIG. 4C. When rotating the screw shaft 111 in the opposite direction, the lever 141 is gradually allowed to return to its neutral position. This return movement may for example be driven by spring force. For example, the lever 141 could be coupled to a spring element which is deformed when rotating the lever 141 out of its neutral position, or the lever 141 could itself exhibit a spring characteristic.

Accordingly, FIGS. 3B and 3C define limits of the above-mentioned first range of the linear movement of the nut element 121, and FIGS. 4B and 4C define limits of the above-mentioned second range of the linear movement of the nut element 121. Here, it is noted that in the illustrated example the first range and the second range are separated, i.e., do not overlap. However, it would also be possible to have some overlap of the first range and the second range. In this case, a part of the displacement of the main portion 51 would occur simultaneously with the tilting of the flap elements 52, 53.

Figure 5A:
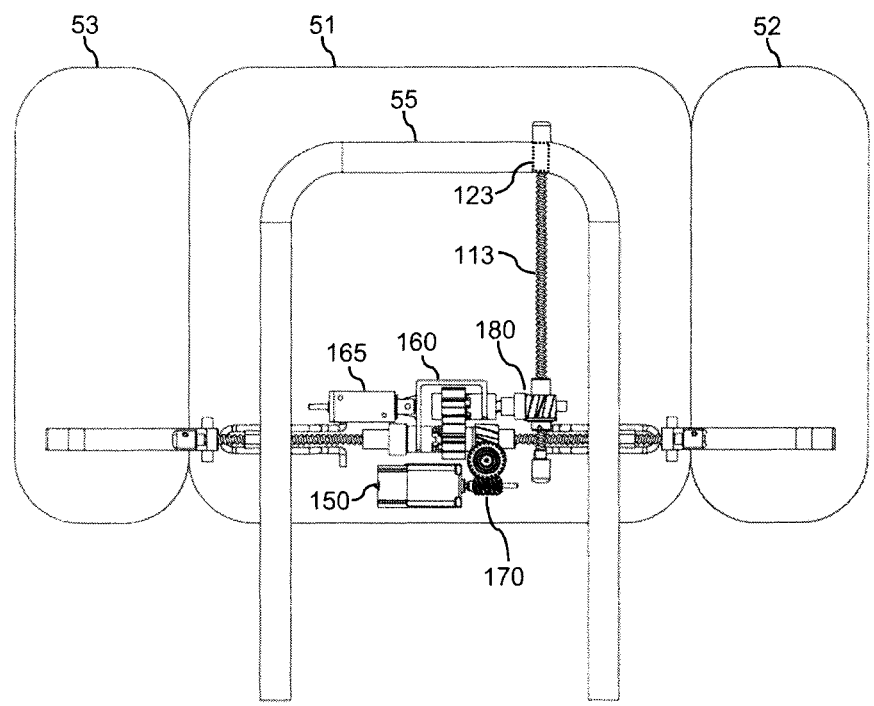
FIGS. 5A and 5B illustrate adjustment of the headrest by vertical displacement of the headrest.
Figure 5B:
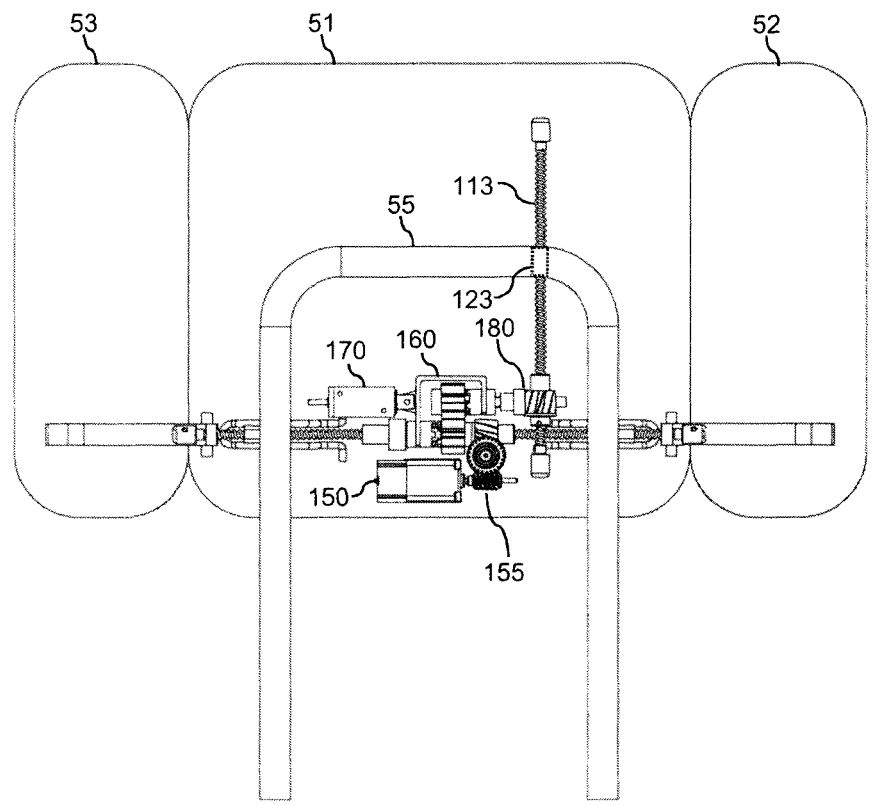

FIGS. 5A and 5B illustrate further adjustment of the headrest 50 by vertical displacement. Specifically, FIGS. 5A and 5B show rear views of the headrest 50 in different vertical positions, with the adjustment mechanism being exposed for purposes of illustration. FIG. 5A illustrates the headrest 50 its lowermost position and FIG. 5B illustrates the headrest 50 being displaced upwardly from the lowermost position.

As illustrated in FIGS. 5A and 5B, the adjustment mechanism includes a third screw shaft 113, which extends in vertical direction. A third nut element 123 is engaged with the third screw shaft 113 and connected to the bracket 55. The third screw shaft 113 and the third nut element 123 provide a vertically adjustable coupling of the headrest 50 to the bracket 55. In particular, rotation of the third screw shaft 113 will cause a linear movement of the third nut element 123 of the third screw shaft 113, thereby vertically displacing the headrest 50, as illustrated by FIGS. 5A and 5B.

FIGS. 5A and 5B further illustrate the motor 150, which in the illustrated example is used for driving the first screw shaft 111, the second screw shaft 112, and the third screw shaft 113. The motor 150 may be an electric motor and may be electronically controlled to adjust the seat 10. The motor 150 may for example be a brushless motor, e.g., using an electronic commutation scheme. Implementing the motor 150 as a brushless motor may help to reduce noise and/or improve durability and reliability. Since motor 150 is used for driving both screw shafts 111, 112 and usage of multiple motors is therefore not necessary, excessive costs for using a brushless motor can be avoided.

For coupling the motor 150 to the screw shafts 111, 112, 113, the adjustment mechanism is provided with gears 155, 180 and a clutch mechanism 160 as further explained below. The gear 155 is a two-stage worm gear which facilitates a compact implementation of the adjustment mechanism and at the same time allows for efficient adaptation of a revolution speed of the motor 150 to a desired rotation speed of the screw shafts 111, 112, 113. The gear 180 is a worm gear used for translation of a rotation along the horizontal axis of the first and second screw shafts 111, 112 and the vertical axis of the third screw shaft 113. The clutch mechanism 160 allows for selectively engaging the motor 150 either with the first and second screw shafts 111, 112 or with the third screw shaft 113. The clutch mechanism 160 is provided with an actuator 170 which allows for electronically controlling a state of the clutch mechanism 160. In particular, the actuator 170 may be used for electronically switching the clutch mechanism 160 between a first state, in which the motor 150 is engaged with the first and second screw shafts 111, 112 and a second state, in which the motor 150 is engaged with the third screw shaft 113. In the illustrated example, the actuator 170 is assumed to be a solenoid actuator. However, other types of actuator could be used as well. As for example further explained below, also an SMA based actuator could be used for switching between the states of the clutch mechanism 160.

By using the clutch mechanism 160 to engage the motor 150 with the third screw shaft 113 while disengaging the motor 150 from the first and second screw shafts 111, 112, the motor 150 can be used for exclusively driving the third screw shaft 113, thereby allowing to adjust the vertical position of the headrest 50, without vertically displacing the headrest 50 or tilting the flap elements 52, 53 of the headrest 50. Similarly, by using the clutch mechanism 162 engage the motor 150 with the first and second screw shafts 111, 112 while disengaging the motor 150 from the third screw shaft 113, the motor 150 can be used for exclusively driving the first and second screw shafts 111, 112, thereby allowing to vertically displace the main portion 51 of the headrest 50 and/or to tilt the flap elements 52, 53 of the headrest 50, while maintaining the vertical position of the headrest 50.

Figure 6:
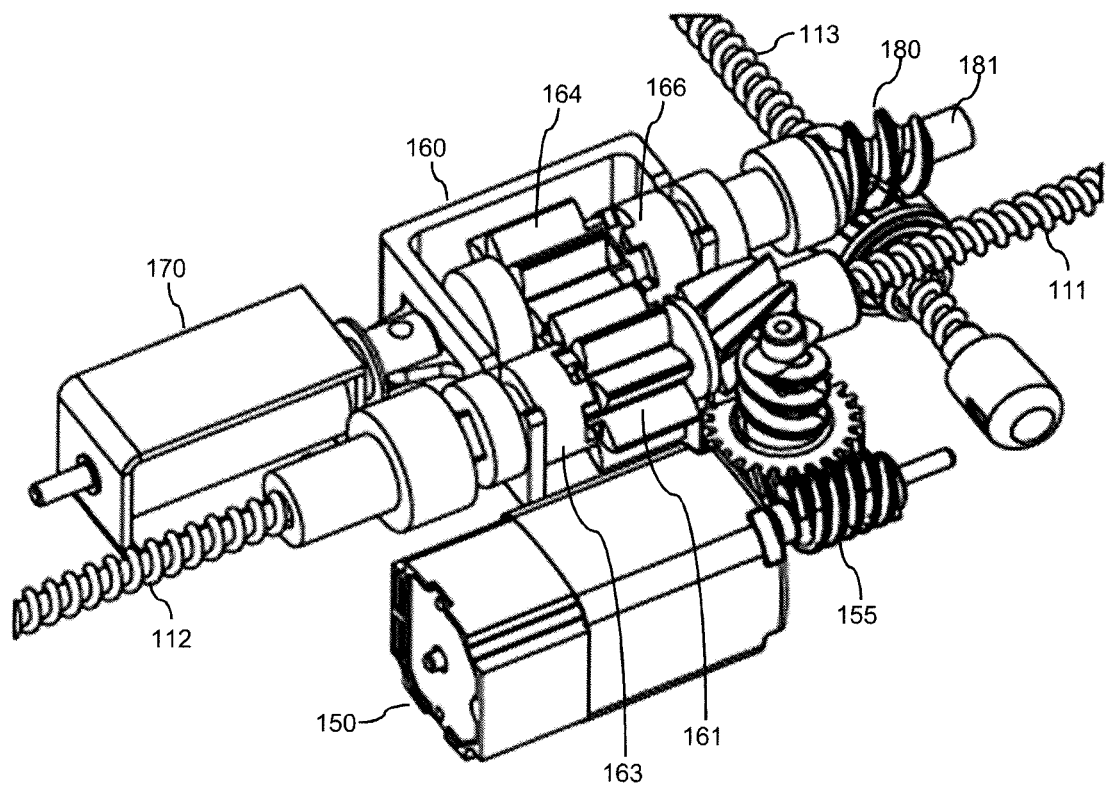
FIG. 6 illustrates a clutch mechanism of the adjustment mechanism.

FIG. 6 further illustrates the clutch mechanism 160 of the adjustment mechanism. As illustrated, the clutch mechanism 160 includes a first gear wheel 161 which is driven by the two-stage worm gear 155. As mentioned above, the first and second screw shaft 111, 112 are formed as different portions of the same drive shaft. The first gear wheel 161 is arranged concentrically with this drive shaft, but is rotatable about the drive shaft. Accordingly, a rotation of the first gear wheel 161 does not necessarily translate into a rotation of the drive shaft. Next to the first gear wheel 161, also concentrically with the axis of the drive shaft, a first clutch wheel 163 is arranged on the drive shaft. The first clutch wheel 163 rotates together with the drive shaft. The first gear wheel 161 and the first clutch wheel 163 have opposing axial faces which are configured to be used for selectively engaging the first gear wheel 161 and the first clutch wheel 163 by bringing the opposing axial faces together. As further explained below, the first gear wheel 161 and the first clutch wheel 163 may be provided with axially extending teeth on their respective axial face, and the first gear wheel 161 and the first clutch wheel 163 may be engaged by interlocking of these axially extending teeth. For facilitating engagement and/or disengagement of the axial teeth, the axial teeth may have sloped mating faces, e.g., inclined by an angle of 5° or less with respect to the axial direction. However, it is noted that other ways of engaging the first gear wheel 161 and the first clutch wheel 163 could be used as well, e.g., engagement by surface friction. If the first clutch wheel 163 is engaged with the first gear wheel 161, the drive shaft and thus also the first and second screw shafts 111, 112 rotate together with the first gear wheel 161, i.e., are driven by the motor 150. If the first clutch wheel 163 is disengaged from the first gear wheel 161, the driveshaft and thus also the first and second screw shafts 111, 112 do not rotate together with the first gear wheel 161, i.e., are not driven by the motor 150.

The clutch mechanism further includes a second gear wheel 164 arranged on a further drive shaft 181 which is arranged in parallel to the drive shaft of the first and second screw shafts 111, 112. The second gear wheel 164 is engaged with the first gear wheel 161. Accordingly, the motor 150 drives the second gear wheel 164 through the first gear wheel 161. The second gear wheel 164 is arranged concentrically with the further drive shaft 181 while being rotatable about the further drive shaft 181. Accordingly, a rotation of the second gear wheel 164 does not necessarily translate into a rotation of the further drive shaft 181. Next to the second gear wheel 164, concentrically with the axis of the further drive shaft 181, a second clutch wheel 166 is arranged on the further drive shaft 181. The second clutch wheel 166 rotates together with the further drive shaft 181. The second gear wheel 164 and the second clutch wheel 166 have opposing axial faces which are configured to be used for selectively engaging the second gear wheel 164 and the second clutch wheel 166 by bringing the opposing axial faces together. As further explained below, also the second gear wheel 164 and the second clutch wheel 163 may be provided with axially extending teeth on their respective axial face, and the second gear wheel 164 and the second clutch wheel 166 may be engaged by interlocking of these axially extending teeth. For facilitating engagement and/or disengagement of the axial teeth, the axial teeth may have sloped mating faces, e.g., inclined by an angle of 5° or less with respect to the axial direction. However, it is noted that other ways of engaging the second gear wheel 164 and the second clutch wheel 166 could be used as well, e.g., engagement by surface friction. If the second clutch wheel 166 is engaged with the second gear wheel 164, the further drive shaft 181 rotates together with the second gear wheel 164, i.e., is driven by the motor 150. Through the worm gear 180, the further drive shaft 181 then drives the third screw shaft 113. If the second clutch wheel 166 is disengaged from the second gear wheel 164, the further drive shaft 181 and thus also the third screw shaft 113 does not rotate together with the second gear wheel 166, i.e., is not driven by the motor 150.

The actuator 170 is used for controlling engagement of the first clutch wheel 163 with the first gear wheel 161 and engagement of the second clutch wheel 166 with the second gear wheel 164. This is accomplished by axial shifting of the first clutch wheel 163 on the drive shaft of the first and second screw shafts 111, 112, and by axial shifting of the second clutch wheel 166 on the further drive shaft 181. This is further illustrated in FIGS. 7A and 7B.

Figure 7A:
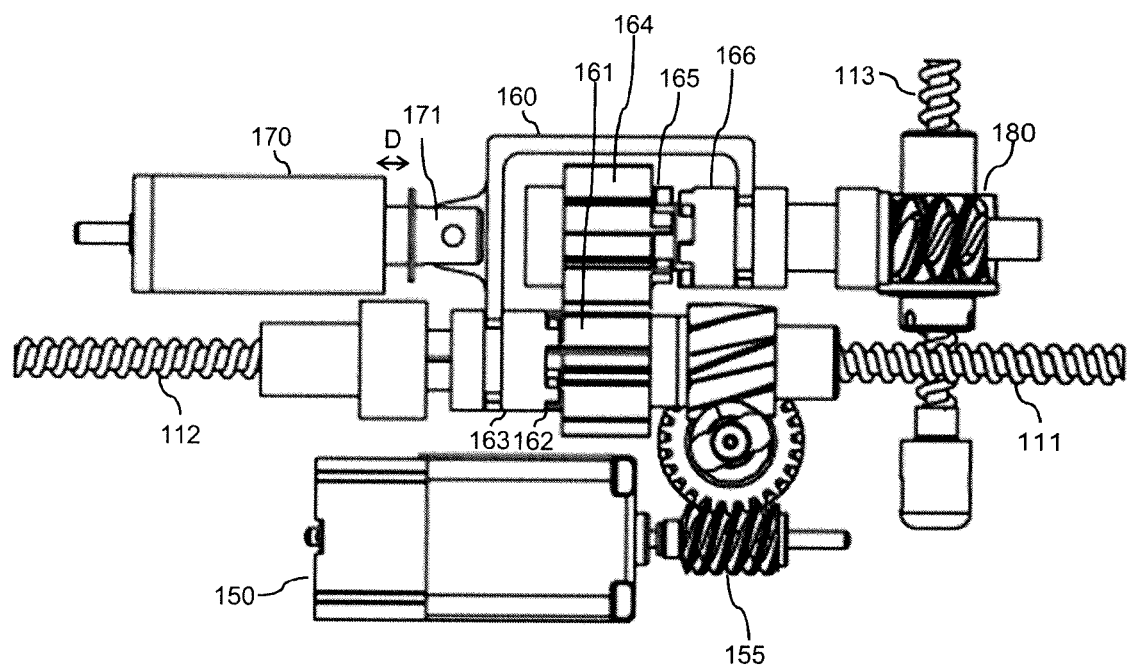
FIGS. 7A and 7B illustrate different states of the clutch mechanism.

FIG. 7A illustrates the clutch mechanism 160 in the first state, in which the motor 150 is engaged with the first and second screw shafts 111, 112 and disengaged from the third screw shaft 113. As can be seen, in the first state an effector end 171 of the actuator 170 is extended by a travel distance D. The effector end 171 is coupled to both the first clutch wheel 163 and the second clutch wheel 166. As a result, the first clutch wheel 163 is shifted towards the first gear wheel 161, and the second clutch wheel 166 is shifted away from the second gear wheel 164. Accordingly, the first clutch wheel 163 engages with the first gear wheel 161, while the second clutch wheel 166 is disengaged from the second gear wheel 164. As illustrated, the engagement of the first clutch wheel 163 with the first gear wheel 161 is achieved by interlocking of axial teeth 162 of the first gear wheel 161 with complementary axial teeth of the first clutch wheel 163. For facilitating engagement and/or disengagement of the axial teeth 162 of the first gear wheel 161 with the complementary axial teeth of the first clutch wheel 163, the axial teeth 162 and complementary axial teeth may have sloped mating faces, e.g., inclined by an angle of 5° or less with respect to the axial direction. Due to the sloped mating faces, the axial teeth 162 have an outer shape which tapers toward the first clutch wheel 163 and fits into a narrowing gap between two neighboring complementary teeth of the first clutch wheel 163. However, other ways of engaging the first clutch wheel 163 with the first gear wheel 161 could be used as well.

Figure 7B:
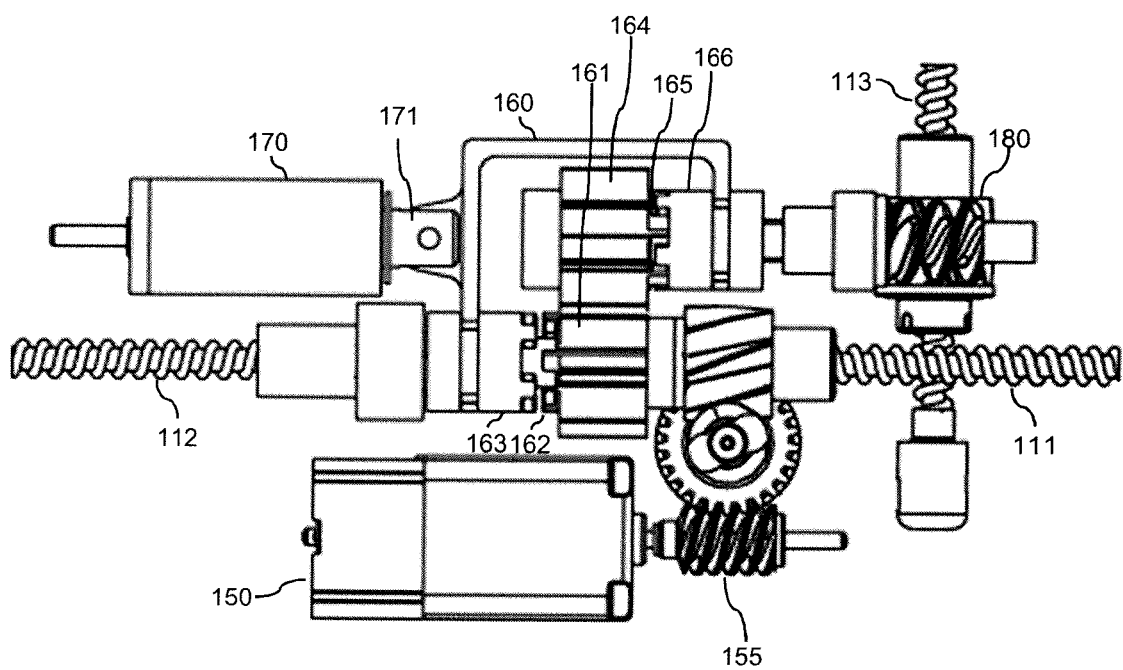

FIG. 7B illustrates the clutch mechanism 160 in the second state, in which the motor 150 is engaged with the third screw shaft 113 and disengaged from the first and second screw shafts 111, 112. As can be seen, in the second state the effector end 171 of the actuator 170 is retracted. As a result, the first clutch wheel 163 is shifted away from the first gear wheel 161, and the second clutch wheel 166 is shifted towards the second gear wheel 164. Accordingly, the first clutch wheel 163 is disengaged from the first gear wheel 161, while the second clutch wheel 166 engages with the second gear wheel 164. As illustrated, the engagement of the second clutch wheel 166 with the second gear wheel 164 is achieved by interlocking of axial teeth 165 of the second gear wheel with complementary axial teeth of the second clutch wheel 166. For facilitating engagement and/or disengagement of the axial teeth 165 of the second gear wheel 165 with the complementary axial teeth of the second clutch wheel 166, the axial teeth 165 and complementary axial teeth may have sloped mating faces, e.g., inclined by an angle of 5° or less with respect to the axial direction. Due to the sloped mating faces, the axial teeth 165 have an outer shape which tapers toward the second clutch wheel 166 and fits into a narrowing gap between two neighboring complementary teeth of the second clutch wheel 166. However, other ways of engaging the second clutch wheel 166 with the second gear wheel 164 could be used as well.

As can be seen, the adjustment mechanism of the illustrated example may be used for efficiently controlling adjustment of the seat 10 according to the different degrees of freedom by a single motor, namely for controlling horizontal displacement of the headrest 50, in particular for controlling displacement of the main portion 51 of the headrest 50 in the forward/backward direction, for adjusting the side bolsters of the headrest 50 by tilting the flap elements 52, 53, and for controlling displacement of the headrest 50 in the vertical direction, i.e., for adjusting the height position of the headrest 50. The adjustment mechanism may be implemented in a compact manner which allows for accommodating the adjustment mechanism within the headrest 50.

It is noted that while the above example referred to adjustment of the seat 10 according to three different degrees of freedom, a similar adjustment mechanism could also be used for controlling the seat 10 according to only two degrees of freedom, e.g., only for controlling only the horizontal displacement of the headrest 50 and the vertical displacement of the headrest 50. Still further, as an alternative or in addition to controlling the horizontal or vertical displacement of the headrest 50, the adjustment mechanism could also be used for controlling tilting of the headrest 50. Furthermore, in addition or as an alternative to the above examples of controlling degrees of freedom related to adjustment of the headrest 50, the adjustment mechanism could also be used for controlling degrees of freedom related to adjustment of the backrest portion 30, such as adjustment of the lumbar support 40 by controlling vertical displacement of the lumbar support 40 and/or arching of the lumbar support 40, and/or degrees of freedom related to the seat cushion portion 20, such as controlling the length of the seat cushion portion 25 by controlling horizontal displacement of the seat cushion element 25 and/or adjustment of leg support by controlling tilting of the flap element 26. Depending on the controlled degrees of freedom, the adjustment mechanism could also be accommodated within the backrest portion 30 or the seat cushion portion 20 of the seat 10.

The location for accommodating the adjustment mechanism may also depend on the degrees of freedom to be controlled. For example, in the case of a degree of freedom related to the backrest portion 30, such as controlling lumbar support or adjustment of side bolsters of the backrest portion 30, the adjustment mechanism could be arranged in the backrest portion 30 of the seat 10. Similarly, in the case of controlling a degree of freedom related to the seat cushion portion 20, such as adjustment of seat cushion length or adjustment of leg support, the adjustment mechanism could be arranged in the seat cushion portion 20 of the seat 10. However, in some scenarios the adjustment mechanism could also be located differently. For example, for controlling a degree related to the headrest 50, a part of the adjustment mechanism could also be arranged in the backrest portion 30. For controlling degrees of freedom relating to the headrest 50 and the backrest portion 30, the adjustment mechanism could also have components in accommodated in the headrest 50 and components accommodated in the backrest portion 30.

In some implementations, the adjustment mechanism may use more than three screw shafts for controlling adjustment of the seat 10. In such cases, each of the screw shafts may be used for controlling adjustment of the seat 10 according to at least one degree of freedom. As explained above, different ranges of linear motion of a nut element engaged with one of the screw shafts may be used for controlling multiple degrees of freedom with the same screw shaft. One or more clutch mechanisms may be used for selectively controlling one or more of multiple screw shafts, and/or other types of drive shafts, by the same motor.

Figure 8:
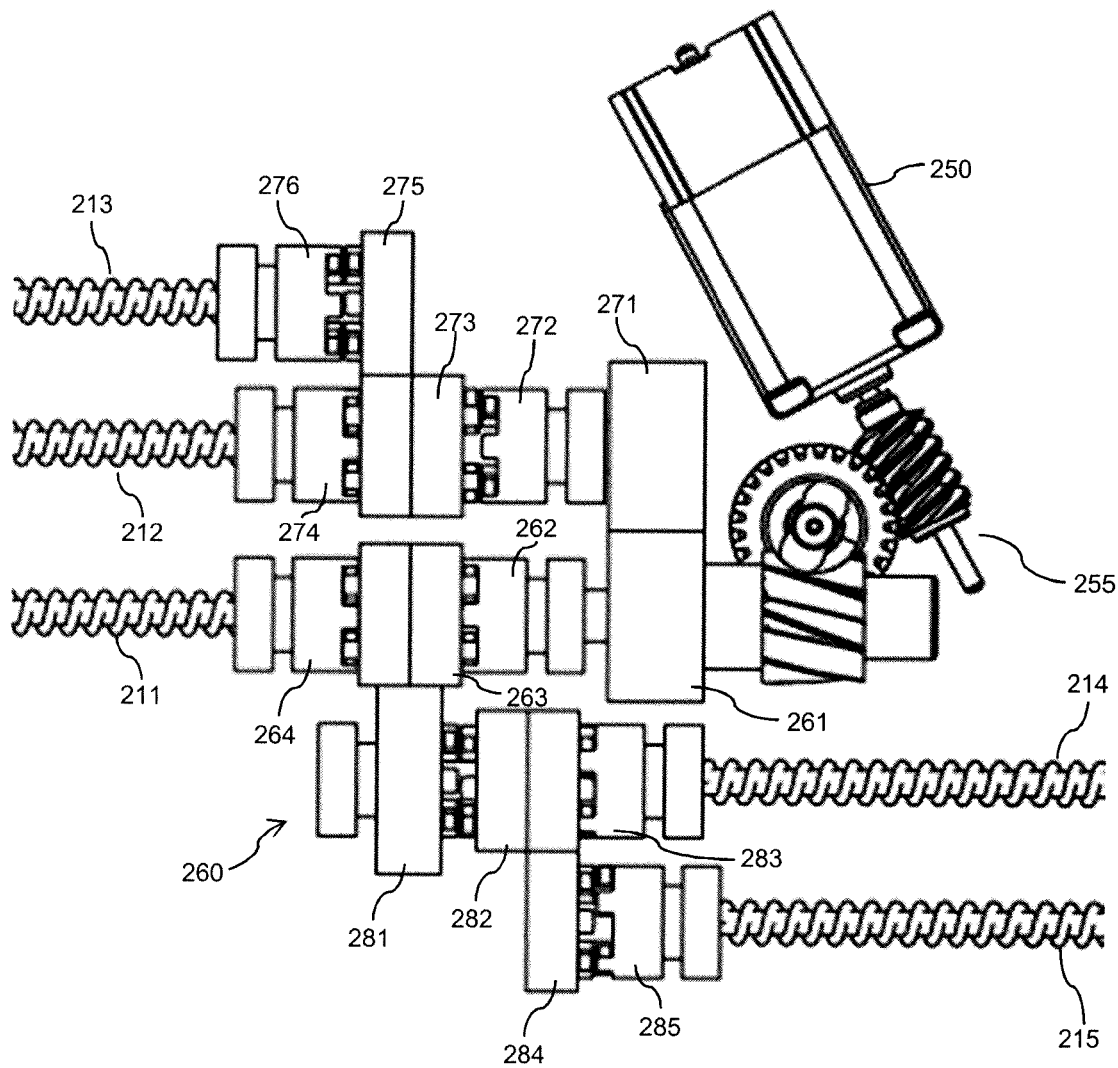
FIG. 8 illustrates a further clutch mechanism which may be used in an adjustment mechanism according to an embodiment of the invention.

FIG. 8 illustrates a further example of a clutch mechanism 260 for an adjustment mechanism of the seat 10. The clutch mechanism to 160 may be used as an alternative or in addition to the above-mentioned clutch mechanism 160. As illustrated, the clutch mechanism 260 may be used for selectively driving multiple screw shafts 211, 212, 213, 214, 215 with a single motor 250, e.g., an electronically controlled electric motor. The motor 250 may for example be a brushless motor, e.g., using an electronic commutation scheme. Implementing the motor 250 as a brushless motor may help to reduce noise and/or improve durability and reliability. Since the motor 250 is used for driving all screw shafts 211, 212, 213, 214, 215 and usage of multiple motors is therefore not necessary, excessive costs for using a brushless motor can be avoided. For at least one of the screw shafts 211, 212, 213, 214, 215, different ranges of linear motion of a nut element engaged with one of the screw shafts may be used for controlling multiple degrees of freedom, such as explained in connection with FIGS. 2A, 2B, 2C, 3A, 3B, 3C, 4A, 4B, and 5C.

In the clutch mechanism 260 the motor 250 uses a two-stage worm gear 255 to drive a first gear wheel 261 and a first clutch wheel 262 on a drive shaft of the screw shaft 211. A second gear wheel 263 is arranged next to the first clutch wheel 262 while being rotatable about the drive shaft of the screw shaft 211. Accordingly, a rotation of the second gear wheel 263 does not necessarily translate into a rotation of the drive shaft of the screw shaft 211. The first clutch wheel 262 and the second gear wheel 263 have opposing axial faces which are configured to be used for selectively engaging the first clutch wheel 262 and the second gear wheel 263 by bringing the opposing axial faces together. As illustrated, this engagement may be achieved by interlocking of axial teeth of the first clutch wheel 262 and complementary axial teeth of the second gear wheel 263. For facilitating engagement and/or disengagement of the axial teeth with the complementary axial teeth, the axial teeth of the first clutch wheel 262 and the complementary axial teeth of the second gear wheel 263 may have sloped mating faces, e.g., inclined by an angle of 5° or less with respect to the axial direction. Due to the sloped mating faces, the axial teeth have an outer shape which tapers toward the second gear wheel 263 and fits into a narrowing gap between two neighboring complementary teeth of the second gear wheel 263. However, other ways of engaging the opposing axial surfaces could be used as well.

Next to the second gear wheel 263, a second clutch wheel 264 is arranged on the drive shaft of the screw shaft 211. The second clutch wheel 264 rotates together with the screw shaft 211. The second gear wheel 263 and the second clutch wheel 264 have opposing axial faces which are configured to be used for selectively engaging the second gear wheel 263 and the second clutch wheel 264 by bringing the opposing axial faces together. As illustrated, this engagement may be achieved by interlocking of axial teeth of the second clutch wheel 264 and complementary axial teeth of the second gear wheel 263. For facilitating engagement and/or disengagement of the axial teeth with the complementary axial teeth, the axial teeth of the second clutch wheel 264 and the complementary axial teeth of the second gear wheel 263 may have sloped mating faces, e.g., inclined by an angle of 5° or less with respect to the axial direction. Due to the sloped mating faces, the axial teeth have an outer shape which tapers toward the second gear wheel 263 and fits into a narrowing gap between two neighboring complementary teeth of the second gear wheel 263. However, other ways of engaging the opposing axial surfaces could be used as well.

A third gear wheel 271 and a third clutch wheel 272 are arranged on a drive shaft of the screw shaft 212. The third gear wheel 271 is engaged with and driven by the first gear wheel 261. The third clutch wheel 272 rotates together with the third gear wheel 271 and is thus also driven by the first gear wheel 261. A fourth gear wheel 273 is arranged next to the third clutch wheel 272 while being rotatable about the drive shaft of the screw shaft 212. Accordingly, a rotation of the fourth gear wheel 273 does not necessarily translate into a rotation of the drive shaft of the screw shaft 212. The third clutch wheel 272 and the fourth gear wheel 273 have opposing axial faces which are configured to be used for selectively engaging the third clutch wheel 272 and the fourth gear wheel 273 by bringing the opposing axial faces together. As illustrated, this engagement may be achieved by interlocking of axial teeth of the third clutch wheel 272 and complementary axial teeth of the fourth gear wheel 273. For facilitating engagement and/or disengagement of the axial teeth with the complementary axial teeth, the axial teeth of the third clutch wheel 272 and the complementary axial teeth of the fourth gear wheel 273 may have sloped mating faces, e.g., inclined by an angle of 5° or less with respect to the axial direction. Due to the sloped mating faces, the axial teeth have an outer shape which tapers toward the fourth gear wheel 273 and fits into a narrowing gap between two neighboring complementary teeth of the fourth gear wheel 273. However, other ways of engaging the opposing axial surfaces could be used as well.

Next to the fourth gear wheel 273, a fourth clutch wheel 274 is arranged on the drive shaft of the screw shaft 212. The fourth clutch wheel 274 rotates together with the screw shaft 212. The fourth gear wheel 273 and the fourth clutch wheel 274 have opposing axial faces which are configured to be used for selectively engaging the fourth gear wheel 273 and the fourth clutch wheel 274 by bringing the opposing axial faces together. As illustrated, this engagement may be achieved by interlocking of axial teeth of the fourth clutch wheel 274 and complementary axial teeth of the fourth gear wheel 273. For facilitating engagement and/or disengagement of the axial teeth with the complementary axial teeth, the axial teeth of the fourth clutch wheel 274 and the complementary axial teeth of the fourth gear wheel 273 may have sloped mating faces, e.g., inclined by an angle of 5° or less with respect to the axial direction. Due to the sloped mating faces, the axial teeth have an outer shape which tapers toward the fourth gear wheel 273 and fits into a narrowing gap between two neighboring complementary teeth of the fourth gear wheel 273. However, other ways of engaging the opposing axial surfaces could be used as well.

A fifth gear wheel 275 is arranged on a drive shaft of the screw shaft 213. The fifth gear wheel 275 is engaged with and driven by the fourth gear wheel 273. The fifth gear wheel 275 is rotatable about the drive shaft of the screw shaft 213. Accordingly, a rotation of the fifth gear wheel 275 does not necessarily translate into a rotation of the screw shaft 213. Next to the fifth gear wheel 275, a fifth clutch wheel 276 is arranged on the drive shaft of the screw shaft 213. The fifth clutch wheel 276 rotates together with the screw shaft 213. The fifth gear wheel 275 and the fifth clutch wheel 276 have opposing axial faces which are configured to be used for selectively engaging the fifth gear wheel 275 and the fifth clutch wheel 276 by bringing the opposing axial faces together. As illustrated, this engagement may be achieved by interlocking of axial teeth of the fifth clutch wheel 276 and complementary axial teeth of the fifth gear wheel 275.

For facilitating engagement and/or disengagement of the axial teeth with the complementary axial teeth, the axial teeth of the fifth clutch wheel 276 and the complementary axial teeth of the fifth gear wheel 275 may have sloped mating faces, e.g., inclined by an angle of 5° or less with respect to the axial direction. Due to the sloped mating faces, the axial teeth have an outer shape which tapers toward the fifth gear wheel 275 and fits into a narrowing gap between two neighboring complementary teeth of the fifth gear wheel 275. However, other ways of engaging the opposing axial surfaces could be used as well.

A sixth gear wheel 281 is arranged on a drive shaft of the screw shaft 214. The sixth gear wheel 281 is engaged with and driven by the second gear wheel 263. The sixth gear wheel 281 is rotatable about the drive shaft of the screw shaft 214. Accordingly, a rotation of the sixth gear wheel 281 does not necessarily translate into a rotation of the screw shaft 214. A seventh gear wheel 282 is arranged next to the sixth gear wheel 281 while being rotatable about the drive shaft of the screw shaft 214. Accordingly, a rotation of the seventh gear wheel 282 does not necessarily translate into a rotation of the screw shaft 214. The sixth gear wheel 281 and the seventh gear wheel 282 have opposing axial faces which are configured to be used for selectively engaging the sixth gear wheel 281 and the seventh gear wheel 282 by bringing the opposing axial faces together. As illustrated, this engagement may be achieved by interlocking of axial teeth of the sixth gear wheel 281 and complementary axial teeth of the seventh gear wheel 282. For facilitating engagement and/or disengagement of the axial teeth with the complementary axial teeth, the axial teeth of the sixth gear wheel 281 and the complementary axial teeth of the seventh gear wheel 282 may have sloped mating faces, e.g., inclined by an angle of 5° or less with respect to the axial direction. Due to the sloped mating faces, the axial teeth have an outer shape which tapers toward the seventh gear wheel 282 and fits into a narrowing gap between two neighboring complementary teeth of the seventh gear wheel 282. However, other ways of engaging the opposing axial surfaces could be used as well.

Next to the seventh gear wheel 282, a sixth clutch wheel 283 is arranged on the drive shaft of the screw shaft 214. The sixth clutch wheel 283 rotates together with the screw shaft 214. The seventh gear wheel 282 and the sixth clutch wheel 283 have opposing axial faces which are configured to be used for selectively engaging the seventh gear wheel 282 and the sixth clutch wheel 283 by bringing the opposing axial faces together. As illustrated, this engagement may be achieved by interlocking of axial teeth of the sixth clutch wheel 283 and complementary axial teeth of the seventh gear wheel 282.

For facilitating engagement and/or disengagement of the axial teeth with the complementary axial teeth, the axial teeth of the sixth clutch wheel 283 and the complementary axial teeth of the seventh gear wheel 282 may have sloped mating faces, e.g., inclined by an angle of 5° or less with respect to the axial direction. Due to the sloped mating faces, the axial teeth have an outer shape which tapers toward the seventh gear wheel 282 and fits into a narrowing gap between two neighboring complementary teeth of the seventh gear wheel 282. However, other ways of engaging the opposing axial surfaces could be used as well.

An eighth gear wheel 284 is arranged on a drive shaft of the screw shaft 215. The eighth gear wheel 284 is engaged with and driven by the seventh gear wheel 282. The eighth gear wheel 284 is rotatable about the drive shaft of the screw shaft 215. Accordingly, a rotation of the eighth gear wheel 284 does not necessarily translate into a rotation of the screw shaft 215. Next to the eighth gear wheel 284, a seventh clutch wheel 285 is arranged on the drive shaft of the screw shaft 215. The seventh clutch wheel 285 rotates together with the screw shaft 215. The eighth gear wheel 284 and the seventh clutch wheel 285 have opposing axial faces which are configured to be used for selectively engaging the eighth gear wheel 284 and the seventh clutch wheel 285 by bringing the opposing axial faces together. As illustrated, this engagement may be achieved by interlocking of axial teeth of the seventh clutch wheel 285 and complementary axial teeth of the eighth gear wheel 284. For facilitating engagement and/or disengagement of the axial teeth with the complementary axial teeth, the axial teeth of the seventh clutch wheel 285 and the complementary axial teeth of the eighth gear wheel 284 may have sloped mating faces, e.g., inclined by an angle of 5° or less with respect to the axial direction. Due to the sloped mating faces, the axial teeth have an outer shape which tapers toward the eighth gear wheel 284 and fits into a narrowing gap between two neighboring complementary teeth of the eighth gear wheel 284. However, other ways of engaging the opposing axial surfaces could be used as well.

The clutch mechanism 260 can be brought into various different states, depending on whether the above-mentioned clutch wheels or gear wheels are engaged with each other. The screw shaft 211 is driven by the motor 250 if the first clutch wheel 262 is engaged with the second gear wheel 263 and the second clutch wheel 264 is engaged with the second gear wheel 263. The screw shaft 212 is driven by the motor 250 if the third clutch wheel 272 is engaged with the fourth gear wheel 273 and the fourth clutch wheel 274 is engaged with the fourth gear wheel 273. The screw shaft 213 is driven by the motor 250 if the fifth clutch wheel 276 is engaged with the fifth gear wheel 275 and the fourth gear wheel 273 is engaged with the third clutch wheel 272. The screw shaft 214 is driven by the motor 250 if the sixth clutch wheel 283 is engaged with the seventh gear wheel 282, the seventh gear wheel 282 is engaged with the sixth gear wheel 281, and the second gear wheel 263 is engaged with the first clutch wheel 262. The screw shaft 215 is driven by the motor 250 if the seventh clutch wheel 285 is engaged with the eighth gear wheel 284, the seventh gear wheel 282 is engaged with the sixth gear wheel 281, and the second gear wheel 263 is engaged with the first clutch wheel 262.

Further, each of the screw shafts 211, 212, 213, 214, 215 can be disengaged from the motor 250: By disengaging the second clutch wheel 264 from the second gear wheel 263, the screw shaft 211 can be disengaged from the motor 250, while at the same time allowing any other of the screw shafts 212, 213, 214, 215 to be engaged with the motor 250. By disengaging the fourth clutch wheel 274 from the fourth gear wheel 273, the screw shaft 212 can be disengaged from the motor 250, while at the same time allowing any other of the screw shafts 211, 213, 214, 215 to be engaged with the motor 250. By disengaging the fifth clutch wheel 276 from the fifth gear wheel 275, the screw shaft 213 can be disengaged from the motor 250, while at the same time allowing any other of the screw shafts 211, 212, 214, 215 to be engaged with the motor 250. By disengaging the sixth clutch wheel 283 from the seventh gear wheel 282, the screw shaft 214 can be disengaged from the motor 250, while at the same time allowing any other of the screw shafts 211, 212, 213, 215 to be engaged with the motor 250. By disengaging the seventh clutch wheel 285 from the eighth gear wheel 284, the screw shaft 215 can be disengaged from the motor 250, while at the same time allowing any other of the screw shafts 211, 212, 213, 214 to be engaged with the motor 250.

Accordingly, by providing each of the screw shafts 211, 212, 213, 214, 215 with at least one gear wheel which is rotatable about a drive shaft of the respective screw shaft 211, 212, 213, 214, 215 and with a clutch wheel which rotates together with the screw shaft and can be selectively engaged with the respective gear wheel, the clutch mechanism 260 can flexibly support various states. As further can be seen from the clutch mechanism 260, gear wheels on one drive shaft may be used for driving other drive shafts and at the same time be used for selective engagement with a clutch wheel or other gear wheel. This allows for a compact and efficient implementation of the clutch mechanism 260.

In the clutch mechanism 260, multiple actuators may be used for selectively engaging the clutch wheels and gear wheels as described above. These actuators may be implemented as solenoid actuators, similar as described for the above-mentioned actuator 170. However, other types of actuators could be used as well, such as SMA based actuators. The clutch mechanism 260 could also use a combination of two or more different types of actuators, such as a combination of solenoid based actuators and SMA based actuators. Further, it is also possible to use one actuator for engaging more than one pair of wheels, such as described for the above-mentioned actuator 170.

Figure 9:
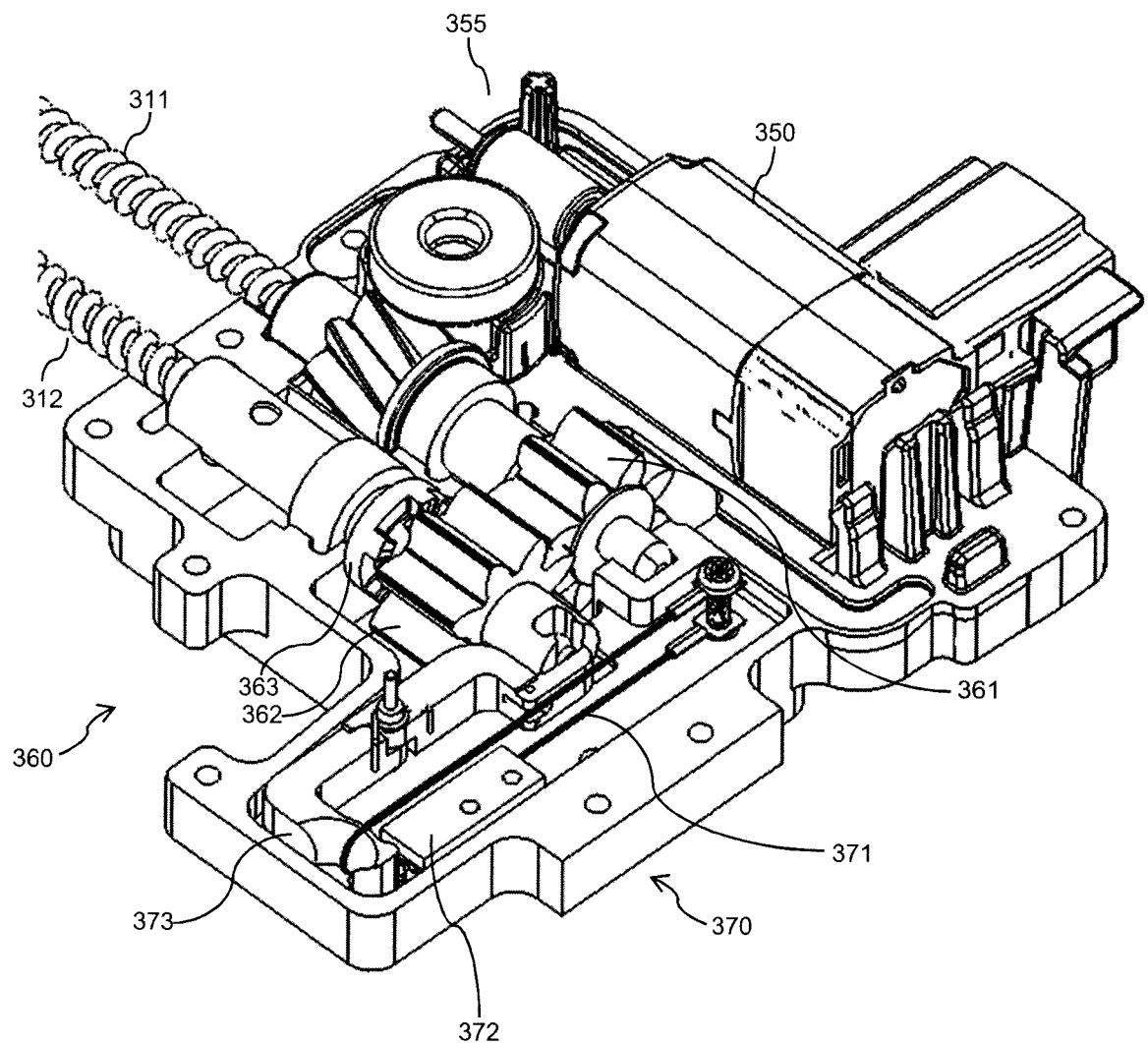
FIG. 9 illustrates a still further clutch mechanism which may be used in an adjustment mechanism according to an embodiment of the invention.

FIG. 9 illustrates a still further clutch mechanism 360 which may be used in an adjustment mechanism as explained above, e.g., in addition or as an alternative to the abovementioned clutch mechanism 160 or 260. As illustrated, the clutch mechanism 260 may be used for selectively driving multiple screw shafts 311, 312 with a single motor 350, e.g., an electronically controlled electric motor. The motor 350 may for example be a brushless motor, e.g., using an electronic commutation scheme. Implementing the motor 350 as a brushless motor may help to reduce noise and/or improve durability and reliability. Since the motor 350 is used for driving both screw shafts 311, 312 and usage of multiple motors is therefore not necessary, excessive costs for using a brushless motor can be avoided. For at least one of the screw shafts 311, 312, different ranges of linear motion of a nut element engaged with one of the screw shafts may be used for controlling multiple degrees of freedom, such as explained in connection with FIGS. 2A, 2B, 2C, 3A, 3B, 3C, 4A, 4B, and 5C.

In the clutch mechanism 360, the motor 350 uses a two-stage worm gear 355 to drive the screw shaft 311. A first gear wheel 361 rotating together with the screw shaft 311 is used to drive a second gear wheel 362. The second gear wheel 362 is arranged on a drive shaft of the screw shaft 312, while being rotatable about the drive shaft of the screw shaft 312. Accordingly, a rotation of the second gear wheel 362 does not necessarily translate into a rotation of the screw shaft 312. Next to the second gear wheel 362, a clutch wheel 363 is arranged on the driveshaft of the screw shaft 312. The clutch wheel 363 rotates together with the screw shaft 312. The second gear wheel 362 and the clutch wheel 363 have opposing axial faces which are configured to be used for selectively engaging the clutch wheel 363 with the second gear wheel 362 by bringing the opposing axial faces together. As illustrated, this engagement may be achieved by interlocking of axial teeth of clutch wheel 363 and complementary axial teeth of the second gear wheel 362. For facilitating engagement and/or disengagement of the axial teeth with the complementary axial teeth, the axial teeth of the clutch wheel 363 and the complementary axial teeth of the second gear wheel 362 may have sloped mating faces, e.g., inclined by an angle of 5° or less with respect to the axial direction. Due to the sloped mating faces, the axial teeth have an outer shape which tapers toward the second gear wheel 362 and fits into a narrowing gap between two neighboring complementary teeth of the second gear wheel 362. However, other ways of engaging the opposing axial surfaces could be used as well.

In the clutch mechanism 360, the engagement of the clutch wheel 363 with the second gear wheel 362 is controlled by an SMA based actuator 370. As illustrated, the SMA based actuators 370 includes an SMA wire 371 and an electronically controlled heater 372. In response to heating of the SMA wire 371 by the heater 372, the SMA wire 371 changes its length. For example, the SMA wire 371 may shorten in response to heating by the heater 372. Shortening of the SMA wire 371 actuates a lever 373 which pushes the second gear wheel 362 in an axial direction towards the clutch wheel 363, thereby engaging the clutch wheel 363 with the second gear wheel 362. In response to cooling of the SMA wire 371, the length of the SMA wire 371 increases, thereby moving the second gear wheel 362 away from the clutch we have 363 and thus disengaging the clutch wheel three and 63 from the second gear wheel 362. In the illustrated example, the lever 373 is formed of two parts which are flexibly connected to each other. This allows for avoiding excessive stress, e.g., if the lever 373 pushes the second gear wheel 362 towards the clutch wheel 363 while the axial teeth of the second gear wheel 362 and the complementary axial teeth of the clutch wheel 363 are misaligned and thus impair movement of the second gear wheel 362 towards the clutch wheel 363.

In the clutch mechanism 360, both screw shafts 311, 312 are driven by the motor 350 if the clutch wheel 363 is engaged with the second gear wheel 362. If the clutch wheel 363 is disengaged from the second gear wheel 362, only the screw shaft 311 is driven by the motor 350. This may for example be useful for both controlling vertical position of the lumbar support 40 of the seat 10 and arching of the lumbar support 40 of the seat: Driving both screw shafts 311 and 312 may be used for adjustment of the vertical position of the lumbar support 40, while driving only one of the screw shafts 311 and 312 may be used for adjustment of the arching. For this purpose, nut elements on the screw shafts 311 and 312 may be coupled to different engagement points on the lumbar support 40, so that relative movement of these engagement points with respect to each other causes parking of the lumbar support 40. Different ranges of movement of at least one of the nut elements may be used for controlling one or more additional degrees of freedom for adjustment of the seat 10, While exemplary embodiments have been described in the context of a vehicle seat, the adjustment mechanisms and seats according to embodiments of the invention are not limited to this particular application. Rather, adjustment mechanisms as explained above may be employed in a wide variety of seats. Further, it is noted that the illustrated adjustment mechanisms may be modified in various ways. By way of example, the adjustment mechanisms could include various numbers of screw shafts and be accommodated within various parts of the seat. Further, one or more of the screw shafts could be replaced by other kinds of shafts, e.g., torsion shafts, or other additional types of shafts could be used to supplement the above-mentioned screw shafts and be driven by the same motor. Further, one or more of the screw shafts could or other shafts could also be flexible or include flexible portions. Accordingly, the above-described clutch mechanisms may be used for driving screw shafts, but also for driving various other types of drive shafts, in addition or as an alternative to screw shafts as described above. In some cases such screw shafts or drive shafts may also extend from one part of the seat to another part of the seat, e.g., from the backrest portion to the headrest or vice versa. Further, it is also possible to use an adjustment mechanism which is distributed over multiple parts of the seat 10, e.g., by accommodating some components of the adjustment mechanism in the backrest portion 30 of the seat 10 and accommodating other components of the adjustment mechanism in the headrest 50 and/or the seat cushion portion 20 of the seat 10. Further, adjustment mechanisms as explained above may be used for adjustment of a seat with respect to various combinations of degrees of freedom. For example, using similar principles as explained above for the tilting of the side bolsters, tilting of the headrest, e.g., as denoted by HT in FIG. 1A, could be implemented by using different ranges of linear movement of a nut element on the same screw shaft. Forward tilting of the headrest 50 could then for example start when the headrest 50 has reached its maximum upward position.

The invention claimed is:

1. An adjustment mechanism for a seat, the adjustment mechanism comprising:
   a plurality of screw shafts;
   a motor for driving the plurality of screw shafts; and
   a clutch mechanism configured to selectively engage the motor with one or more screw shafts of the plurality of screw shafts,
   wherein a rotation of at least one of the one or more screw shafts caused by the motor translates into adjustment of the seat according to a first degree of freedom and a rotation of at least another one of the one or more screw shafts caused by the motor translates into adjustment of the seat according to a second degree of freedom,
   wherein the plurality of screw shafts includes at least one first screw shaft and at least one second screw shaft, and
   wherein the adjustment mechanism includes at least one nut element engageable with the at least one first screw shaft,
   whereby a rotation of the at least one first screw shaft caused by the motor translates into a linear motion of the at least one nut element, and
   whereby in a first range of the linear motion of the at least one nut element the linear motion translates into adjustment of the seat according to one of the first degree of freedom and the second degree of freedom and in a second range of the linear motion of the at least one nut element the linear motion translates into adjustment of the seat according to a third degree of freedom.

2. The adjustment mechanism according to claim 1, wherein on a drive shaft of at least one screw shaft of the plurality of screw shafts the clutch mechanism includes a first wheel rotatable with respect to the drive shaft and a second wheel selectively engageable with the first wheel.

3. The adjustment mechanism according to claim 2, wherein at least one of the first wheel or the second wheel is a gear wheel engaged with a gear wheel on a drive shaft of another screw shaft of the plurality of screw shafts.

4. The adjustment mechanism according to claim 1, wherein the first degree of freedom and the second degree of freedom correspond to two different degrees of freedom selected from the group of 1) displacement of a headrest of the seat in a horizontal direction, 2) tilting of a headrest of the seat, 3) vertical displacement of a headrest of the seat, 4) tilting of at least one flap element of the seat, 5) vertical displacement of a lumbar support of the seat, 6) adjustment of arching of a lumbar support of the seat, and 7) adjustment of a length of a seat cushion portion of the seat.

5. The adjustment mechanism according to claim 1, wherein the first degree of freedom corresponds to displacement of a headrest of the seat in a horizontal direction or to tilting of the headrest and the second degree of freedom corresponds to displacement of a headrest of the seat in a vertical direction.

6. The adjustment mechanism according to claim 1,
   wherein the first degree of freedom corresponds to displacement of a headrest of the seat in a horizontal direction or to tilting of the headrest and the second degree of freedom corresponds to displacement of a headrest of the seat in a vertical direction, and
   wherein the headrest includes at least one flap element pivotable with respect to a main portion of the headrest and the third degree of freedom corresponds to pivoting of the at least one flap element with respect to the main portion of the headrest.

7. The adjustment mechanism according to claim 6, wherein the headrest includes a first flap element pivotable with respect to the main portion of the headrest and a second flap element pivotable with respect to the main portion of the headrest, and wherein the second degree of freedom corresponds to pivoting of the first flap element and the second flap element with respect to the main portion of the headrest.

8. The adjustment mechanism according to claim 1, wherein at least one screw shaft of the plurality of screw shafts is arranged in a horizontal direction.

9. The adjustment mechanism according to claim 1, wherein at least one screw shaft of the plurality of screw shafts is arranged in a vertical direction.

10. The adjustment mechanism according to claim 1, wherein at least one screw shaft of the plurality of screw shafts is arranged in a horizontal direction and at least one other screw shaft of the plurality of screw shafts is arranged in a vertical direction.

11. The adjustment mechanism according to claim 1, wherein the clutch mechanism includes at least one solenoid actuator for switching the clutch mechanism between a first state in which the motor is engaged with one or more screw shafts of the plurality of screw shafts and a second state in which the motor is not engaged with the one or more screw shafts.

12. The adjustment mechanism according to claim 1, wherein the clutch mechanism includes at least one shape memory alloy actuator for switching the clutch mechanism between a first state in which the motor is engaged with one or more screw shafts of the plurality of screw shafts and a second state in which the motor is not engaged with the one or more screw shafts.

13. The adjustment mechanism according to claim 1, wherein the adjustment mechanism is configured to be accommodated within a headrest of the seat, within a backrest portion of the seat, or within a seat cushion portion of the seat.

14. A seat comprising at least one adjustment mechanism according to claim 1.

* * * * *